Patented July 11, 1933

1,917,686

UNITED STATES PATENT OFFICE

RAYMOND F. BACON, OF BRONXVILLE, AND ISAAC BENCOWITZ, OF NEW YORK, N. Y.; SAID BENCOWITZ ASSIGNOR TO SAID BACON

RECOVERY OF SULPHUR

No Drawing.  Application filed July 30, 1930.  Serial No. 471,888.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals such, for example, as copper and nickel, with hydrogen chloride for the purpose of obtaining free sulphur.

The present invention is based on our discovery that reactions between hydrogen chloride and pyrites are promoted by small amounts of water vapor. When pyrites-bearing material is heated in the presence of hydrogen chloride and a small amount of water vapor under suitably controlled conditions, hydrogen sulphide, sulphur dioxide and ferrous chloride are produced. Oxides of iron and other heavy metals which may be present in the material being treated may also be produced, but the reactions may be so controlled that substantially all of the pyrites is converted to ferrous chloride and substantially all other heavy metal sulphides such, for example, as copper and nickel sulphides, which may be present in the sulphide-bearing material may be converted into the corresponding chlorides. In an ordinary commercial operation, the iron remaining after treatment of pyrites-bearing material will be present in the form of ferric oxide and ferrous chloride. The relative amounts of ferrous chloride and ferric oxide produced will be determined by the temperature employed and the quantity of water vapor present during the course of the reaction. At relatively low temperatures, substantially complete conversion of the pyrites to ferrous chloride may be accomplished in the presence of relatively large amounts of water vapor. At relatively high temperatures, relatively small amounts of water vapor must be employed in order to effect a conversion of substantial amounts of pyrites to ferrous chloride. The amount of water vapor employed will be determined by the results desired. At suitable temperatures, only a sufficient amount of water vapor to serve in the capacity of a catalytic agent may be employed. At high temperatures, the amount of water vapor employed should be carefully controlled when it is desired to effect substantially complete conversion of the pyrites to ferrous chloride. The necessary amount of water vapor may be provided by introducing the pyrites-bearing material into the reaction chamber in a damp or moist condition.

The reactions involved will take place satisfactorily at temperatures above 300° C. but at relatively low temperatures the reactions proceed very slowly. Temperatures between 550° C. and 800° C. may be used advantageously, and at such temperatures only sufficient water vapor to serve in the capacity of a catalyst should be employed. Ordinarily, a maximum temperature of about 600° C. is entirely satisfactory.

A complete process of the invention involves the treatment of pyrites-bearing material with hydrogen chloride and water vapor to produce hydrogen sulphide and sulphur dioxide. We prefer to so conduct the reaction that a substantially complete conversion of pyrites to ferrous chloride is effected. The hydrogen sulphide and sulphur dioxide produced are caused to react to liberate elemental sulphur. In order to produce elemental sulphur, the hydrogen sulphide and sulphur dioxide are preferably passed in contact with a catalytic agent capable of promoting the desired reaction. The treatment of the pyrites-bearing material is so conducted that ferrous chloride and chlorides of other heavy metals which might be present in the material being treated are produced. The resulting chloride-bearing material may be treated to regenerate hydrogen chloride to be returned to the process.

The relative amounts of sulphur dioxide and hydrogen sulphide produced may be controlled by regulating the amounts of hydrogen chloride and water vapor employed. The process may be so controlled that two molecules of hydrogen sulphide are produced for every molecule of sulphur dioxide produced, or it may be so controlled that any desired relative amounts of the compounds may be produced and any additional amount of either compound which may be required for the production of elemental sulphur may be supplied from a separate source.

According to the preferred process of the invention, two or more separate operations for the production of mixtures of sulphur dioxide and hydrogen sulphide are conducted simultaneously, and the resulting gases are combined for the purpose of the operation for producing elemental sulphur. It is difficult to so control a single operation as to produce the theoretical amounts of sulphur dioxide and hydrogen sulphide required for carrying out the reaction for the production of elemental sulphur, but an operation may be readily adjusted to produce mixtures of gases containing fixed proportions of hydrogen sulphide and sulphur dioxide with either in excess. We, therefore, prefer to conduct two or more separate operations to produce different mixtures of gases containing hydrogen sulphide and sulphur dioxide in different proportions but all of which may be combined to produce a mixture containing hydrogen sulphide and sulphur dioxide in proper proportions. This procedure permits all of the operations to be conducted continuously without frequent adjustments, or, if the combined gases show a tendency to vary, one of the operations may be utilized for control purposes.

The invention will be better understood from a consideration of the following description of a process for treating ore containing pyrites and sulphides of copper and nickel.

The ore to be treated is introduced in a finely divided condition into the interiors of two similar rotary reaction chambers each having ore charging means at one end and discharging means at the other end, and which are so constructed and operated that the ore is gradually moved from the charging ends toward the discharge ends. Hydrogen chloride and water vapor are introduced into the reaction chambers at the ends opposite to those at which the ore is introduced and the ore and hydrogen chloride and water vapor pass through the reaction chambers in countercurrent relationship, the hydrogen sulphide and sulphur dioxide produced being removed from the reaction chambers at points near the charging ends. All or any desired portion of the water vapor required may be provided by introducing the ore into the reaction chambers in a damp, moist or wet condition.

The ore is preferably ground to provide particles sufficiently small to pass a 100-mesh screen in order that intimate contact of the sulphide particles with the water vapor and hydrogen chloride may be obtained.

The reactions involved proceed satisfactorily at temperatures as low as 300° C. but they proceed more rapidly and more completely at a temperature of about 550° C. to 600° C. It is, therefore, advisable to maintain a temperature of about 550° C. to 600° C. in at least a portion of each reaction chamber. Such a temperature may be maintained in the charging end portions of the reaction chambers to insure the passage of all issuing gases through zones in which conditions are conducive to a complete and rapid reaction.

The process is preferably so controlled that a temperature of about 550° C. to 600° C. is maintained near the charging ends of the reaction chambers and a temperature of about 300° C. to 400° C. is maintained near the discharge end portions of the reaction chambers.

The hydrogen chloride and water vapor are introduced into portions of the reaction chambers which are maintained at a temperature of about 300° C. to 400° C. The hydrogen chloride, water vapor, and metal sulphides react to produce sulphur dioxide, hydrogen sulphide, ferrous chloride and the chlorides of copper and nickel. The chlorides produced and the gangue materials of the original ore are discharged continuously in the form of a solid residue. Small amounts of hydrogen sulphide and sulphur dioxide react within the reaction chambers to produce elemental sulphur which is vaporized. The gases issuing from the reaction chambers are mixtures comprising hydrogen sulphide, sulphur dioxide, sulphur vapor, nitrogen and small amounts of hydrogen chloride.

One of the reaction chambers is preferably operated under constant conditions with respect to temperature and amounts of ore and reagents introduced. The other reaction chamber is preferably utilized for control purposes and operated under variable controlled conditions. The variable operation is so conducted that the gases from the two chambers may be combined to provide hydrogen sulphide and sulphur dioxide in proper proportions for carrying out a reaction for producing elemental sulphur according to the following equation:—

$$2H_2S + SO_2 = 2H_2O + 3S.$$

The mixture of gases is cooled to condense the sulphur vapor contained therein, and the remaining gases are passed in contact with water. For bringing the gases into contact with water the gases and water may be passed in countercurrent relationship through a packed tower. The hydrogen chloride contained in the gases is dissolved in the water to form a dilute solution of hydrochloric acid which promotes a reaction between the hydrogen sulphide and the sulphur dioxide. Elemental sulphur is formed and it may be separated from the hydrochloric acid solution in any desired manner as, for example, by settling and decantation or filtering.

The hot residue containing the heavy metal chlorides and oxides may be treated in any desired manner to regenerate hydrogen chloride and/or to remove the metal values.

We claim:—

1. In a process for treating pyrites to recover sulphur, the improvement which comprises subjecting the pyrites-bearing material to the action of hydrogen chloride in the presence of water vapor.

2. In a process for treating pyrites-bearing material to recover sulphur, the improvement which comprises subjecting the pyrites-bearing material at an elevated temperature to the action of hydrogen chloride in the presence of water vapor, and controlling the amount of water vapor employed to control the amount of ferrous chloride produced.

3. In a process for treating pyrites-bearing material to recover sulphur, the improvement which comprises subjecting pyrites-bearing material to the action of hydrogen chloride in the presence of water vapor under such conditions of temperature and amount of water vapor that controlled amounts of hydrogen sulphide, sulphur dioxide and ferrous chloride are produced.

4. In a process for treating pyrites to recover sulphur, the improvement which comprises subjecting the material in a damp or wet condition to the action of hydrogen chloride at an elevated temperature.

In testimony whereof we affix our signatures.

RAYMOND F. BACON.
ISAAC BENCOWITZ.